(12) United States Patent
Van Weelden et al.

(10) Patent No.: US 8,127,790 B2
(45) Date of Patent: Mar. 6, 2012

(54) HYDRAULIC VALVE WITH A FILTER AND CHECK VALVE BAND

(75) Inventors: Curtis L. Van Weelden, Waukesha, WI (US); Edward A. Flynn, Pewaukee, WI (US)

(73) Assignee: HUSCO Automotive Holdings LLC, Waukesha, WI (US)

( * ) Notice: Subject to any disclaimer, the term of this patent is extended or adjusted under 35 U.S.C. 154(b) by 507 days.

(21) Appl. No.: 12/410,832

(22) Filed: Mar. 25, 2009

(65) Prior Publication Data

US 2010/0243085 A1    Sep. 30, 2010

(51) Int. Cl.
*E03B 7/07* (2006.01)
*F15B 13/044* (2006.01)

(52) U.S. Cl. .................................... 137/550; 137/625.65

(58) Field of Classification Search ............. 137/544, 137/545, 547, 549, 550, 625.65
See application file for complete search history.

(56) References Cited

U.S. PATENT DOCUMENTS

| | | | |
|---|---|---|---|
| 6,848,404 B2 | 2/2005 | Maeyama et al. | |
| 6,899,126 B2 * | 5/2005 | Weigand et al. | 137/512.15 |
| 7,069,947 B2 | 7/2006 | Maeda et al. | |
| 7,328,773 B2 * | 2/2008 | Yamaguchi | 184/6.9 |
| 7,600,531 B2 | 10/2009 | Patze et al. | |
| 2009/0256091 A1 * | 10/2009 | Nordstrom et al. | 251/129.15 |

* cited by examiner

*Primary Examiner* — John Rivell
*Assistant Examiner* — R. K. Arundale
(74) *Attorney, Agent, or Firm* — Quarles & Brady LLP; George E. Haas

(57) ABSTRACT

An hydraulic valve has a body with an exterior surface, a longitudinal bore, and first and second fluid ports in communication with the bore wherein the first fluid port opens through the exterior surface. A band is wrapped in first and second layers around the exterior surface which layers extend over the opening of the first fluid port. The first layer has a plurality of apertures there through and overlaying the opening to provide a filter. The second layer has a flap that flexes in response to pressure to open and close the plurality of apertures thereby acting as a check valve. An actuator slides a spool within the bore thereby selectively connecting and disconnecting the first and second fluid ports.

22 Claims, 2 Drawing Sheets

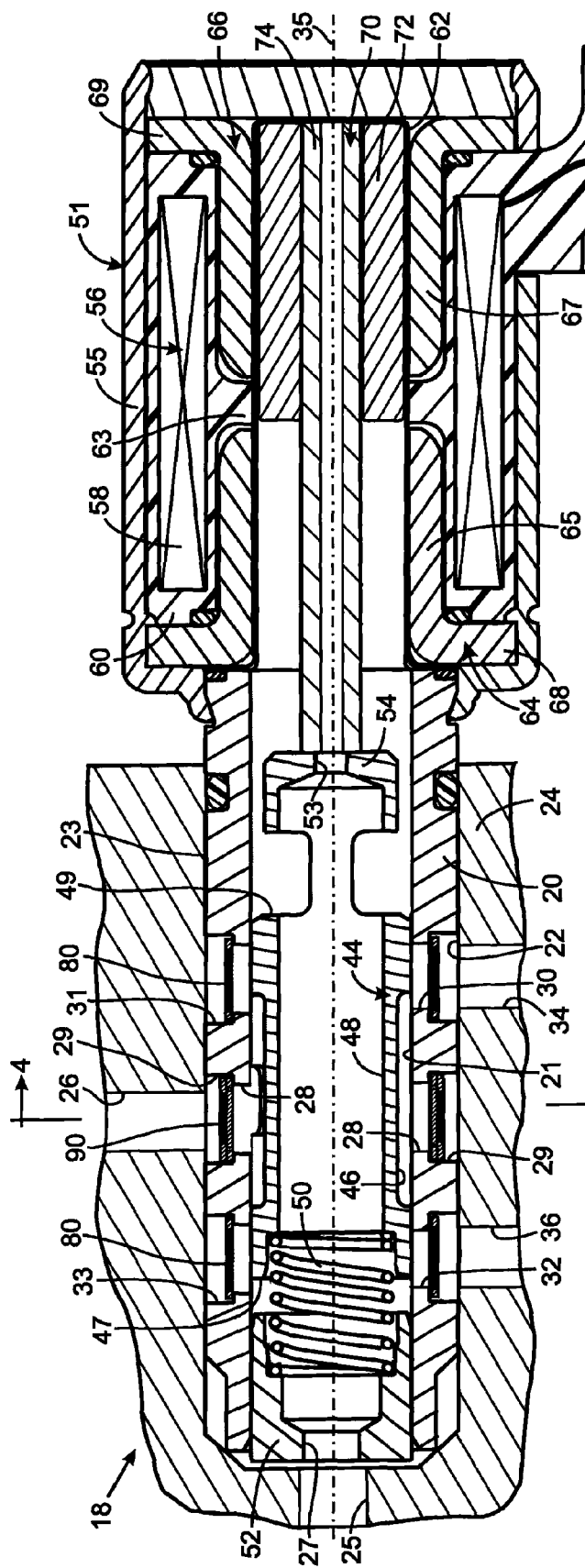
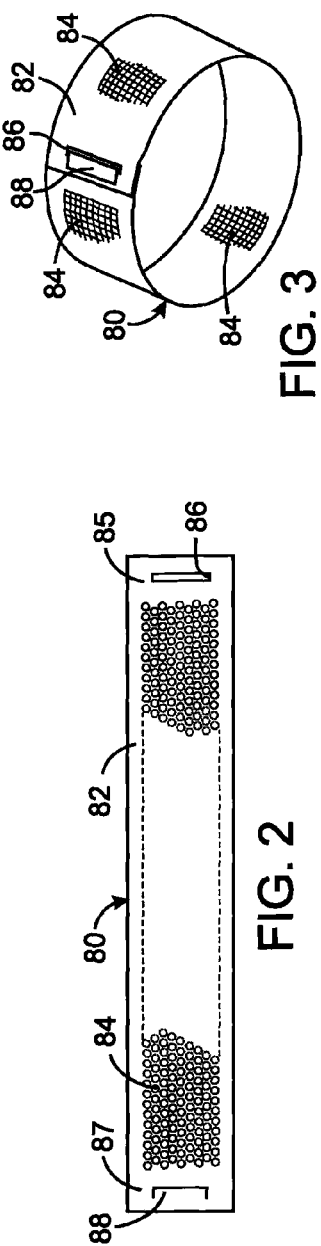
FIG. 1
FIG. 2
FIG. 3

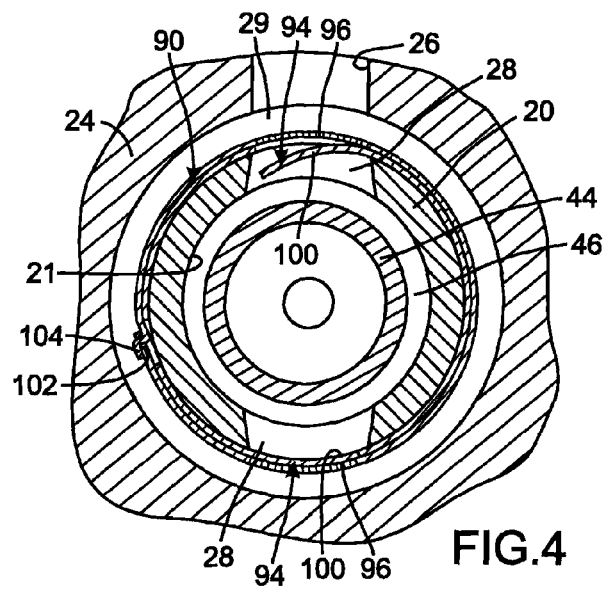
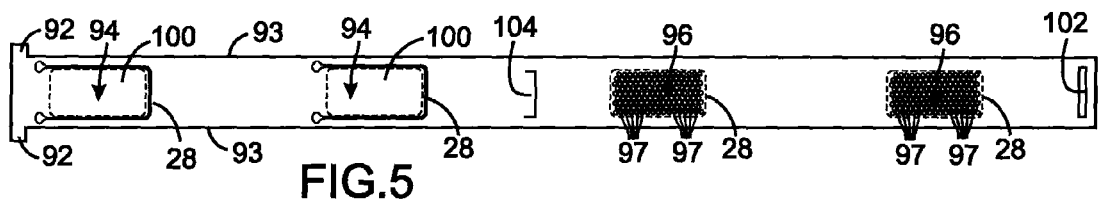
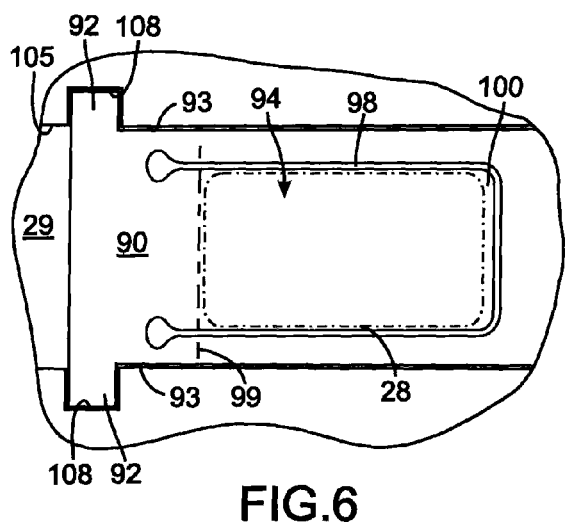
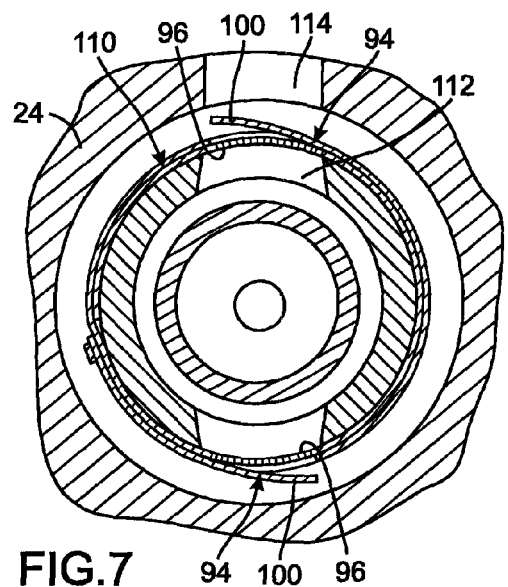

HYDRAULIC VALVE WITH A FILTER AND CHECK VALVE BAND

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to electrically operated spool valves that control flow of a fluid, and more particularly to such valves that have an integral filter and check valve for fluid flowing through the valve.

2. Description of the Related Art

A wide variety of machines have moveable members that are operated by an hydraulic actuator. For example an internal combustion engine has a camshaft which is mechanically coupled to rotate with the crankshaft and which opens and closed cylinder intake and exhaust valves. Traditionally the camshaft timing was fixed at a setting that produced the best operation at all engine operating speeds. However, it has been recognized that engine performance can be improved if the valve timing varies as a function of engine speed, engine load, and other factors. Thus a hydraulic actuator is being used on some engines to vary the coupling relationship of the camshaft to the crankshaft and a solenoid operated valve is employed to control the application of pressurized fluid to operate the hydraulic actuator.

Over time the hydraulic fluid flowing through a machine carry small particles, such as pieces of metal from the engine components. Those particles can block orifices in the valve or become lodged so as to impede motion of valve components. The particles also may adversely affect operation of other elements of the hydraulic system. Some prior valves incorporated filters to prevent the small particles from entering the valve.

Hydraulic systems for controlling engine operation included check valves that allowed fluid to flow in only one direction. For example, a separate check valve connected in a conduit coupled to an inlet or an outlet of solenoid operated valve permitted fluid to flow only to or from that latter valve. However, providing the solenoid operated valve and check valve as separate components increased the number of parts to connect together in the hydraulic system.

SUMMARY OF THE INVENTION

An electrohydraulic valve comprises a body with a longitudinal bore into which a first port and a second port communicate. A spool is slideably received within the bore and has a passage that selectively connects and disconnects the first and second ports in different positions of the spool in the bore. The spool is moved within the bore by an actuator, that preferably is electrically operated.

The first port opens through an exterior surface of the valve body. A band is wrapped around the exterior surface, thereby forming first and second layers of the band extending over the opening of the first port. The first layer has a plurality of apertures there through and overlaying the first port opening, thereby forming a filter. The second layer has a flap that in response to pressure flexes to open and close the plurality of apertures, thereby acting as a check valve to allow fluid flow in only one direction through the plurality of apertures.

In one version of the electrohydraulic valve, the first layer is against the exterior surface of the valve body and the second layer is against a side of the first layer that is remote from the valve body. In this version, the flap forms a check valve that prevents fluid from entering the valve through the plurality of apertures.

In another version of the electrohydraulic valve, the second layer is against the exterior surface of the valve body and the first layer is against a side of the second layer that is remote from the valve body. In this latter version, the flap forms a check valve that prevents fluid from exiting the valve through the plurality of apertures.

BRIEF DESCRIPTION OF THE DRAWINGS

FIG. 1 is a longitudinal cross sectional view through an electrohydraulic valve according the present invention;

FIG. 2 illustrates a filter plate used in the electrohydraulic valve;

FIG. 3 shows the filter plate bent into a tube as occurs upon being mounted around the electrohydraulic valve;

FIG. 4 is a cross sectional view along line 4-4 in FIG. 1 showing a band that provides filters and check valves at inlet ports of the electrohydraulic valve;

FIG. 5 is a plan view of the filter and check valve band;

FIG. 6 is an enlarged plan view of a section of the filter and check valve band showing details of a check valve; and FIG. 7 is a cross sectional view through the electrohydraulic valve showing use of the filter and check valve band at an outlet port.

DETAILED DESCRIPTION OF THE INVENTION

Referring to FIG. 1, an electrohydraulic control valve 18 has a tubular valve body 20 that during use is inserted into an aperture 22 in a manifold 24. The tubular valve body 20 has a longitudinal bore 21 into which a plurality of ports open. A supply passage 26 in the manifold 24 conveys pressurized fluid from a pump or other source and opens into an inlet port 28 of the control valve 18. The inlet port 28 opens into a first annular recess 29 formed in an exterior curved surface 23 of the valve body 20. At the inner end of the manifold aperture 22, a return passage 25 communicates with an outlet port 27 of the valve to convey fluid back to a tank of the hydraulic system. First and second workports 30 and 32 in the tubular valve body 20 communicate with manifold passages 34 and 36 that lead to a hydraulic actuator being controlled. The first and second workports 30 and 32 open into annular recesses 31 and 33, respectively, formed in the exterior curved surface of the valve body 20.

A spool 44 is slideably received within the bore 21 of the valve body 20 and has an exterior annular notch 46 which, in selected positions of the spool, provides fluid paths between the inlet port 28 and the two workports 30 and 32 and thus between the associated manifold passages. In a middle, or intermediate, position of the spool travel, the inlet port 28 is closed from both workports 30 and 32. A central passage 48 extends between the opposite ends 47 and 49 of the spool 44. A head 54 projects from the outward end 49 of the valve spool 44 and has an aperture 53 there through. A spring 50 biases the spool 44 away from a nose piece 52 at the end of the valve body 20 at which the outlet port 27 is located.

The valve 18 also includes a linear actuator 51 with a metal outer housing 55 that surrounds a solenoid coil 58 in a non-magnetic bobbin 60, preferably made of plastic molded around the coil. As used herein, "non-magnetic" designates an object as being neither attracted to or repelled by a magnetic field. The solenoid coil 58 is driven by a pulse width modulated (PWM) electrical signal having a duty cycle that is varied in a conventional manner to move the spool 44 to different desired positions in the valve body 20. The PWM signal is applied to the linear actuator 51 via a connector 57 formed in a lateral projection of the bobbin 60 and connected by wires to the solenoid coil 58.

The linear actuator 51 further includes two magnetically conductive pole pieces 64 and 66. The first pole piece 64 has an interior, tubular section 65 that extends into one end of the bobbin 60. The first pole piece 64 has a first flange 68 which projects outwardly from the tubular section 65 across the outer end of the valve body 20. The second pole piece 66 has a second tubular section 67 extending into the opposite end of the bobbin 60 and has an interior end that is spaced from the first pole piece 64. An inwardly projecting annular rib 63 of the bobbin magnetically separates the first and second pole pieces 64 and 66. The outer end of the second pole piece 66 has a second flange 69 projecting outwardly. A liner tube 62, preferably of stainless steel, is inserted through the first and second pole pieces 64 and 66 and has an open end facing the valve body 20. The opposite end of the liner tube 62 is closed. The liner tube 62 provides a magnetic barrier between the pole pieces, as well as acting as a guide for a sliding actuator plunger 70. The solenoid coil 58, the bobbin 60, the first and second pole pieces 64 and 66, and the liner tube 62 form a solenoid coil assembly 56.

The actuator plunger 70 is slideably located within the aperture of the liner tube 62 and includes an armature 72 of ferromagnetic material. A tubular push member 74 is received within an aperture that extends longitudinally through the armature 72 and both ends of the armature are "ring staked" to the push member. The push member 74 projects outward from the open end of the liner tube 62 and abuts the head 54 of the valve spool 44.

Two filters 80 are wrapped around the valve body 20 to form tubes that cover the two workports 30 and 32. With specific reference to FIGS. 2 and 3, each filter 80 is formed from a thin, flat rectangular plate 82 with a plurality of apertures 84 between its two major surfaces. For example, a standard photolithographic etching process can be employed to form apertures of a size small enough to prevent undesirable particles from entering and adversely affecting operation of the valve. A rectangular aperture 86 is formed in a first end section 85 of the plate 82 and a single U-shaped slot is cut through the plate at the opposite second end section 87 with the opening of the U facing that end. This U-shaped slot defines a rectangular tab 88.

To install a filter 80, its tab 88 is bent perpendicular to the plate 82. Then the second end section 87 of the plate 82 is placed against the valve body 20 with the tab 88 projecting outward. The rectangular plate 82 is wrapped around the valve body 20 in a recess 31 or 33 associated with one of the workports 30 or 32. The first end section 85 of the plate 82 overlaps the second end section 87 with the tab 88 extending through the rectangular aperture 86. The tab 88 then is bent against the surface of the first end section 85, as illustrated in FIG. 3, to secure the plate in tubular shape.

Although the present filter and check valve band is being describe in the context of use on an electrohydraulic spool valve, it should be understood that the band can be used on other types of valves.

With reference again to FIGS. 1 and 4, a filter and check valve band 90 is wound around the valve body within the recess 29 located at the inlet ports 28. As will be described, this band 90 serves both as a filter, similar to the filters 80, and also as a check valve that allows fluid to flow only in a direction from the supply passage 26 into the valve body bore 21. Unlike the filters 80 that are wrapped once around the valve body 20 to form a tube, the filter and check valve band 90 is wrapped substantially twice around the valve body in two convolutions (see FIG. 4), thereby forming first and second layers that overlay the openings of the inlet ports 28.

With reference to FIG. 5, the band 90 is illustrated laid flat prior to installation condition. The band is an elongated strip of metal 0.1 mm thick, for example. A pair of ears 92 project outwardly from each longitudinal side 93 at one end of the band 90. The band has two check valves 94 and two filter areas 96 formed at spaced locations along its length. Those locations correspond to places where the band overlaps the two inlet ports 28 in the valve body 20. Other valves may have a greater or lesser number of inlet ports, in which case the appropriate band has a corresponding different number of check valves 94 and filter areas 96. To understand the physical relationship between the inlet ports 28 and each of the check valves and filter areas, the inlet port positions when the band is wound around the valve body have been indicated by phantom rectangles designated by numeral 28 in FIG. 5.

Each of the filter areas 96 is formed by a pattern of apertures 97 perforating through the band 90 that are sufficient for fluid to flow adequately between the supply passage 26 and the inlet port 28. A standard photolithographic etching process, for example, can be used to form apertures of a size small enough to prevent undesirable particles from entering the valve. With additional reference to FIG. 6, each check valve 94 is defined by a U-shaped slot 98 cut through the band 90 thereby forming a flap 100. As will be described, the flap 100 is able to flex about a line 99 that is transverse to the longitudinal axis of the band and parallel to the longitudinal axis 35 of the valve body bore 21.

A rectangular aperture 102 is formed approximate to the opposite end of the band 90 from the ears 92. Near the midpoint of the band 90, a rectangular tab 104 is created by a U-shaped slot through the band. As will be explained hereinafter, the tab 104 and the aperture 102 are used to hold the band on the valve body 20.

With reference to FIG. 6, the filter and check valve band 90 is attached to the valve body 20 by placing the end of the band with ears 92 into the first annular recess 29. This annular recess 29 has two notches 108 projecting transversely into the side walls 105 of that recess. The two ears 92 of the band are received in those notches 108 to secure the band from sliding in the first annular recess 29 around the valve body as the band is wrapped about the valve body 20. The notches 108 also ensure alignment of the check valves 94 and the filter areas 96 with the inlet ports 28 as that wrapping occurs, see FIG. 4. Prior to the wrapping the band, the tab 104 is bent perpendicular to the band's major surface. At the completion of wrapping the tab 104 is inserted through the rectangular aperture 102 and bent over the remote end of the band to secure that end in place. As an alternative to an aperture 102 and a tab 104, the remote end of the band 90 from the ears 92 can be welded to hold the band tightly wound around the valve body 20. Other techniques for securing the band in place also can be employed.

Assume that the linear actuator 51 has positioned the spool 44 so that the annular notch 46 provides a path between the inlet port 28 and one of the workports 30 or 32 in FIG. 1 and that the pressure in the supply passage 26 is greater than pressure at that one workport. Thus as depicted in FIG. 4, pressurized fluid introduced from the supply passage 26 flows through the apertures of the associated filter area 96 and is applied against the surface of the flap 100 of the check valve 94. The greater pressure from the supply passage 26 forces the flap 100 of the check valve to flex inward toward the center of the valve, thereby providing an opening between the filter apertures and the inlet port 28. This allows fluid to flow through the corresponding filter area 96, into the inlet port 28, and then through the spool to the connected workport.

At other times, a very large load applied to the actuator, that is connected to the associated workport 30 or 32, produces pressure at that workport which is greater than pressure in the supply passage 26. In this situation, when the spool 44 connects that workport to the inlet port 28, the higher workport pressure causes the flap 100 of the check valve 94 to close against the filter area 96 preventing the flow of fluid there through, as depicted for the inlet port 28 at the lower half of FIG. 4. Thus the check valve 94 prevents fluid flow out of the valve through the inlet port 28 into the supply passage 26. It should be appreciated that the opening of one check valve 94 and the closure of the other check valve in FIG. 4 is shown for explanation purposes only, whereas in actuality both check valves will be in the same state simultaneously because they are acted on by the same pressures.

Referring to FIG. 7, a filter and check valve band 110 can be used at a workport 30 or 32 of the valve body or in a similar transverse outlet port to allow fluid to flow only out of the valve 18 and not into the valve through that port. For example, if the workport feeds fluid to a hydraulic motor, it might be undesirable to inhibit fluid to flow backwards from the hydraulic motor into the valve. In this case, a band 110 has a similar configuration to the one in FIG. 5, except that the two check valves 94 and the two filter areas 96 are interchanged in positions. Thus, when the band 110 is wrapped around the valve body 20, the two filter areas 96 are in the inner layer, or convolution, that abuts the curved surface of the valve body as shown in FIG. 7 and the check valves 94 in the outer layer.

Now when pressure within a port 112 of the valve is greater than pressure in the passage 114 of the manifold 24, the check valve flap 100 flexes open allowing fluid to flow through the filter area 96. On the other hand, when pressure in the manifold passage 114 is greater than pressure in the valve port 112, the net force from that pressure differential closes the check valve flap 100 against the filter area 96 blocking the flow of fluid through the filter apertures in the band 110.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. An hydraulic valve comprising:
 a valve body with an exterior surface and a first fluid port and a second fluid port, wherein the first fluid port has an opening in the exterior surface; and
 a band wrapped around the exterior surface forming a first layer and a second layer of the band extending over the opening of the first fluid port, wherein the first layer has at least one aperture there through and overlaying the opening and the second layer has a flap that in response to pressure flexes to open and close every aperture, wherein the first layer is oriented upstream of the second layer in a desired direction of fluid flow through the first fluid port.

2. The hydraulic valve as recited in claim 1 wherein the first layer is proximate to the valve body and the second layer is on a remote side of the first layer from the valve body.

3. The hydraulic valve as recited in claim 1 wherein the second layer is proximate to the valve body and the first layer is on a remote side of the second layer from the valve body.

4. The hydraulic valve as recited in claim 1 wherein the flap is formed by a U-shaped slot extending through the band.

5. The hydraulic valve as recited in claim 1 wherein the flap flexes along a line transverse to a longitudinal axis of the band.

6. The hydraulic valve as recited in claim 1 wherein the band further comprises a first section which a tab is formed, and a second section that has an aperture into which the tab extends to secure the first and second sections together.

7. The hydraulic valve as recited in claim 6 wherein the tab extends through the aperture and is bent against an exterior surface of the second section.

8. The hydraulic valve as recited in claim 1 wherein the band is received in a recess that extends around the valve body.

9. The hydraulic valve as recited in claim 1 wherein the band has an element that engages a feature on the valve body to prevent the band from rotating around the valve body.

10. The hydraulic valve as recited in claim 1 wherein first layer has a plurality of apertures there through, overlaying the opening and forming a filter for fluid flowing through the opening, wherein flexing of the flap opens and closes the plurality of apertures.

11. The hydraulic valve as recited in claim 1 further comprising:
 a spool slideable into different positions within a bore in the valve body, thereby selectively opening and closing a fluid path between the first and second fluid ports; and
 an actuator operably coupled to move the spool into the different positions within the bore.

12. The hydraulic valve as recited in claim 11 wherein the actuator comprises a solenoid coil, an armature slideably received in the solenoid coil, and a push member projecting from the armature into engagement with the spool.

13. An hydraulic valve comprising:
 a valve body with a cylindrical exterior surface and a longitudinal bore, the valve body having a plurality of first fluid ports and a second fluid port both in communication with the bore, wherein each first fluid port opens through the cylindrical exterior surface;
 a band wrapped around the cylindrical exterior surface thereby forming first and second layers of the band extending over the plurality of first fluid ports, wherein the first layer has a plurality of groups of multiple apertures there through with each group overlaying one of the first fluid ports, and the second layer has a plurality of flaps, each of which overlaying one of the first fluid ports and flexing in response to pressure to open and close one group of multiple apertures, and wherein the first layer is oriented upstream of the second layer in a desired direction of fluid flow through the plurality of first fluid ports;
 a valve element slideable into different positions within the bore of the valve body thereby selectively connecting and disconnecting the second fluid port with the plurality of first fluid ports; and an actuator operably coupled to move the valve element into different positions within the bore.

14. The hydraulic valve as recited in claim 13 wherein the first layer is proximate to the valve body and the second layer is on a remote side of the first layer from the valve body.

15. The hydraulic valve as recited in claim 13 wherein the second layer is proximate to the valve body and the first layer is on a remote side of the second layer from the valve body.

16. The hydraulic valve as recited in claim 13 wherein the flap is formed by a U-shaped slot extending through the band.

17. The hydraulic valve as recited in claim 13 wherein the flap flexes along a line that is parallel to a longitudinal axis of the longitudinal bore.

18. The hydraulic valve as recited in claim 13 wherein the band further comprises a first section which a tab is formed, and a section which has an aperture into which the tab extends to secure the first and second end sections together.

19. The hydraulic valve as recited in claim 18 wherein the tab extends through the aperture and is bent against a surface of the second end section.

20. The hydraulic valve as recited in claim 13 wherein the valve body has an annular exterior recess and the band located in the annular exterior recess.

21. The hydraulic valve as recited in claim 13 wherein the band has an element that engages a feature on the valve body to prevent the band from sliding around the valve body.

22. The hydraulic valve as recited in claim 13 wherein the band has a length dimension that extends circumferentially around the valve body, and the plurality of flaps flex about lines that are transverse to the length dimension of the band.

* * * * *